United States Patent [19]

Kanda

[11] Patent Number: 4,693,456
[45] Date of Patent: Sep. 15, 1987

[54] FLUID-FILLED RESILIENT BUSHING WITH CIRCUMFERENTIAL ORIFICE
[75] Inventor: Ryouji Kanda, Inuyama, Japan
[73] Assignee: Tokai Rubber Industries, Ltd., Aichi, Japan
[21] Appl. No.: 906,197
[22] Filed: Sep. 11, 1986
[30] Foreign Application Priority Data
  Sep. 18, 1985 [JP] Japan .......................... 60-142639[U]
[51] Int. Cl.⁴ .............................................. F16F 5/00
[52] U.S. Cl. ................................. 267/140.1; 188/320
[58] Field of Search .................... 188/320; 248/562; 267/35, 57.1 R, 57.1 A, 140.1, 140.3; 384/222

[56] References Cited
U.S. PATENT DOCUMENTS 4,277,056  7/1981  Ticks ............................... 267/140.1
4,377,216  3/1983  Veno ............................ 267/140.1 X
4,605,207  8/1986  Konishi ....................... 267/140.1 X

FOREIGN PATENT DOCUMENTS 48-36151  11/1973  Japan .
52-16554   5/1977  Japan .
56-164242 12/1981  Japan .
59-164428  9/1984  Japan .

Primary Examiner—Duane A. Reger
Attorney, Agent, or Firm—Parkhurst & Oliff

[57] ABSTRACT

A fluid-filled resilient bushing including an inner sleeve, a rubber insert secured to the outer surface of the inner sleeve, an orifice sleeve fitted on the rubber insert, and an outer sleeve fitted on the orifice sleeve. The rubber insert has a plurality of circumferentially spaced-apart pockets which are closed by the orifice sleeve, whereby a plurality of fluid chambers are formed. The orifice sleeve has a circumferential groove formed continuously in its outer surface so as to cover at least one full circumference of the orifice sleeve, and a plurality of radial holes which communicate at their outer ends with the circumferential groove and at their inner ends with the fluid chambers, respectively. The outer sleeve closes the circumferential groove in the orifice sleeve, so as to define a continuous circumferential orifice which communicates with the fluid chambers through the radial holes in the orifice sleeve.

10 Claims, 9 Drawing Figures

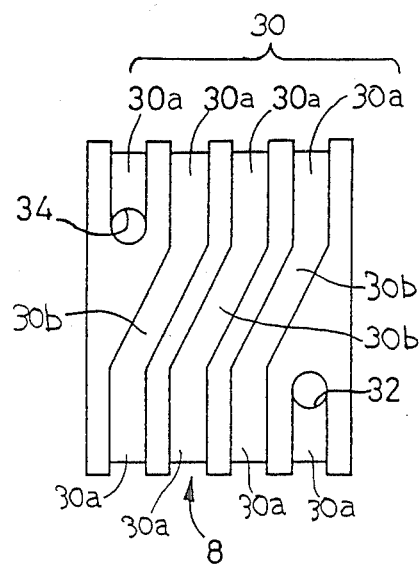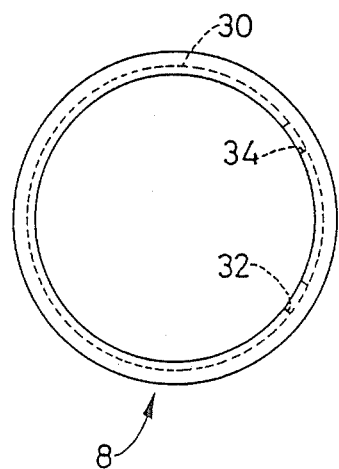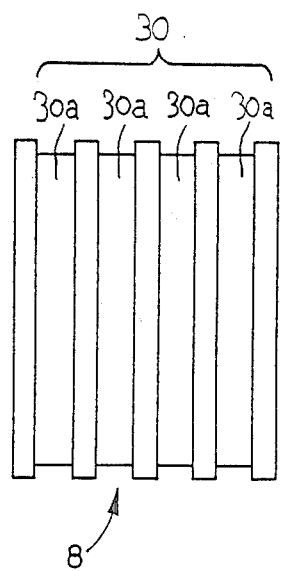

FLUID-FILLED RESILIENT BUSHING WITH CIRCUMFERENTIAL ORIFICE

BACKGROUND OF THE INVENTION

1. Field of the Invention

The present invention relates generally to a fluid-filled resilient bushing assembly adapted to operate utilizing elasticity or resiliency of an elastometric or rubber material, and a resistance of an orifice to a flow of a fluid therethrough. More particularly, the invention is concerned with an improvement in the structure defining an orifice formed in a fluid-filled, bushing-type mounting assembly for vibration damping and isolation.

2. Discussion of the Related Art

In the recent years, a fluid-filled resilient bushing which utilizes elasticity of a rubber material and a fluid flow resistance has been found useful as a vibration damping and isolating mounting structure capable of providing a large degree of vibration damping effect through the fluid flow resistance, for example, as a suspension bushing or engine mount for automotive vehicles. A typical example of such a bushing mounting structure is disclosed in Publication Nos. 48-36151 and 52-16554 of Japanese Patent Applications, which were published for opposition purpose in 1973 and 1977. In the disclosed bushing structure, an inner sleeve and an outer sleeve are disclosed in coaxial and radially spaced-apart relation with each other, and a generally annular resilient member is interposed between the inner and outer sleeves. The mounting structure has a plurality of fluid chambers corresponding to a corresponding number of voids or pockets formed in the resilient member. The fluid chambers are spaced apart from each other in the circumferential direction of the bushing structure. The fluid chambers are filled with a suitable incompressible fluid, and communicate with each other through an orifice or other suitable passage means, so that the fluid may flow from one chamber to another.

In the fluid-filled resilient bushing mounting structure disclosed in the above-identified prior art documents, the construction for defining the orifice for fluid communication between the fluid chambers consists of an inner pipe which is inserted through the resilient member. Another type of construction for defining such an orifice is proposed in Laid-Open Publication No. 56-164242 of Japanese Patent Application (laid open in 1981), wherein an orifice is defined between a sleeve secured to the outer surface of a resilient member, and an outer sleeve press-fitted on that sleeve. A further modified type of construction for defining an orifice is used in a fluid-filled resilient bushing disclosed in U.S. Pat. No. 4,588,174 (claiming the priority of Japanese Patent Aplication No. 58-39818 laid open as Publication No. 59-164428) the co-owner of which includes the assignee of the present application. In the bushing disclosed in this document, a radial stopper member is fitted on the outer surface of an inner sleeve, such that the stopper and the inner sleeve cooperate to define an orifice through which a plurality of fluid chambers or pockets are held in fluid communiction with each other.

In the fluid-filled bushing structures referred to above, the maximum phase angle frequency "c" at which the vibration damping effect attained by means of the resistance of the orifice to a fluid flow, is determined by a cross sectional area of the orifice divided by a length of the orifice. Thus, the maximum phase angle frequency decreases with a decrease in the cross sectional area of the orifice and with an increase in the length of the orifice. However, if the orifice has an excessively small cross sectional area, the amount of flow of the fluid through the orifice is not enough to provide a sufficient damping effect. For the orifice to provide a high degree of damping for low frequency vibrations, that is, to have the maximum phase angle frequency within a low frequency band of vibrations which are required to be damped, it is effective to form the orifice with a relatively large cross sectional area for permitting a sufficient flow of the fluid therethrough, and with a length as large as possible.

In the prior art fluid-filled resilient bushing structures discussed above, however, it is impossible to form the orifice having a length larger than about a half of the full circumference of the inner sleeve or outer sleeve. Therefore, the cross sectional area must be made relatively small to adapt the maximum phase angle frequency of the bushing structure to the desired low frequency band of vibrations. This will cause an inconvenience that the flow of the fluid through the orifice tends to be small as indicated above, and the damping effect for the low frequency vibrations is accordingly reduced.

SUMMARY OF THE INVENTION

It is therefor an object of the present invention to provide a fluid-filled resilient bushing having an generally annular resilient member disposed between an inner sleeve and an outer sleeve, which has means for defining an orifice free from the inconveniences encountered in the conventional counterparts. More specifically, the object of the invention is to provide such a fluid-filled resilient bushing which includes an orifice sleeve fitted on the outer surface of the annular resilient member, so as to cooperate with the outer sleeve to define therebetween a circumferential orifice which is formed continuously generally in the form of a helical or similar passage, so as to cover at lest one full circumference of the orifice sleeve or the outer sleeve.

The above object of the invention can be attained according to the present invention which provides a fluid-filled resilient bushing, comprising an inner sleeve having a cylindrical outer surface, a generally annular resilient member secured by vulcanization to the outer surface of the inner sleeve in co-axial relation with each other, an orifice sleeve positioned radially outward of the reslient member, and an outer sleeve fitted on the outer surface of the orifice sleeve. The generally annular resilient member has a plurality of pockets which are open in an outer surface of the resilient member, and are spaced from each other in a circumferential direction of the resilient member. The orifice sleeve is adapted to close the plurality of pockets formed in the resilient member, thus cooperating with the resilient member to define a plurality of fluid chambers corresponding to the pockets. The orifice sleeve has a circumferential groove formed continously in an outer surface thereof so as to cover at least one full circumference of the orifice sleeve, and further has a plurality of radial communication holes which communicate at their outer ends with the circumferential groove and at their inner ends with the plurality of fluid chambers, respectively. The fluid chambers are filled with an incompressible fluid. The outer sleeve is adapted to close the circumferential groove in the orifice sleeve, so as to define a continous circumferential orifice which communicates with the plurality of fluid chambers through the plurality of radial communication holes. The circumferential orifice has a length corresponding to that of the circumferential groove.

In the fluid-filled resilient bushing of the invention constructed as described above, the fluid chambers are placed in communication with each other through the circumferential orifice formed between the orifice sleeve and the outer sleeve, which orifice which has a suitable length not less than the circumference of the orifice sleeve, e.g., approximately two or three times the circumference of the orifice sleeve or outer sleeve. Thus, the length of the circumferential orifice of the present bushing is considerably larger than the length of an orifice provided in the conventional bushing, which is equal to a half of the circumference of the outer sleeve, at the largest.

Therefore, the orifice of the present bushing may have a comparatively large cross sectional area, permitting a sufficiently large flow of the fluid therethrough. This enables the bushing to have a maximum phase angle frequency within a low frequency band of vibrations, for example, 5–50 Hz, namely, enables the bushing to provide a relatively high degree of damping effect for such low frequency vibrations that are desired to be damped effectively by the bushing.

According to one advantageous feature of the invention, the circumferential groove formed in the orifice sleeve has a helical portion which enables ends of the circumferential groove to be spaced apart from each other in the axial direction of the orifice sleeve.

According to another advantageous feature of the invention, the circumferential groove has a plurality of turns round the circumference of the orifice sleeve. Each turn of the circumferential groove includes a straight portion formed perpendicularly to an axis of the orifice sleeve, and a helical portion formed at a predetermined angle with respect to the straight portion. Accordingly, the ends of the circumferential groove and consequently the ends of the circumferential orifice are spaced apart from each other in the axial direction of the orifice sleeve. In this case, the plurality of turns of the circumferential groove are parallel to each other. The plurality of fluid chambers formed in the bushing may consists of two fluid chambers which communicate with each other through the orifice and through two radial communication holes which communicate with the ends of the circumferential groove or orifice.

According to a further advantageous feature of the invention, the resilient bushing structure may further comprise a rigid sleeve secured to the outer surface of the generally annular resilient member. This rigid sleeve has a plurality of windows corresponding to the pockets fomred in the resilient member. The windows are dimensioned so as not to close the coresponding pockets in the resilient member. In this case, the orifice sleeve is fitted on the outer surface of the rigid sleeve. Generally, the rigid sleeve is secured to the outer surface of the resilient member during vulcanization of the reslient member, so that the reslient member may be pre-compressed in the radial direction by the rigid sleeve. Further, the rigid sleeve may effectively serve to facilitate mounting of the orifice sleeve on the resilient member, by means of a press fitting operation, in particular.

In one form of the above feature of the invention, the opposite axial ends of the orifice sleeve are spaced by predetermined distances away from corresponding opposite ends of the rigid sleeve in axially inward directions of the orifice sleeve. In this case, the resilient bushing further comprises a pair of sealing means which are disposed axially outward of the opposite axial ends of the orifice sleeve and between the rigid sleeve and the outer sleeve. Each of the sealing means may comprise a metallic ring having an annular groove formed in an inner surface thereof, and an O-ring accommodated in the annular groove.

In accordance with a still further advantageous feature of the invention, the outer sleeve comprises a rubber layer having a predetermined thickness, which contacts the outer surface of the orifice sleeve and thereby fluid-tightly closes the circumferential groove so as to define the continuous circumferential orifice.

According to yet another feature of the invention, the resilient bushing further comprises a stopper block which is secured to the inner sleeve so as to extend into the plurality of fluid chambers toward an inner surface of the orifice sleeve. The stopper block and the orifice sleeve are adapted to be abutable on each other upon a predetermined amount of relative displacement of the inner sleeve and the outer sleeve toward each other due to application of a vibrational load to the resilient bushing to the inner and outer sleeves.

BRIEF DESCRIPTION OF THE DRAWINGS

The foregoing and optional objects of the present invention will become more apparent by reading the following description of a preferred embodiment of the invention, when considered in conjunction with the accompanying drawings, in which:

FIG. 5 is a front elevational view of an orifice sleeve of the bushing of FIG. 1;

FIG. 6 is a side elevational view of the orifice sleeve of FIG. 5;

FIG. 7 is a rear elevational view of the orifice sleeve of FIG. 5;

DESCRIPTION OF THE PREFERRED EMBODIMENT

To further clarify the principle of the present invention, there will be described in detail one preferred embodiment of the invention in the form of a suspension bushing used in a suspension system of a motor vehicle, by reference to the accompanying drawings.

Figure 1:
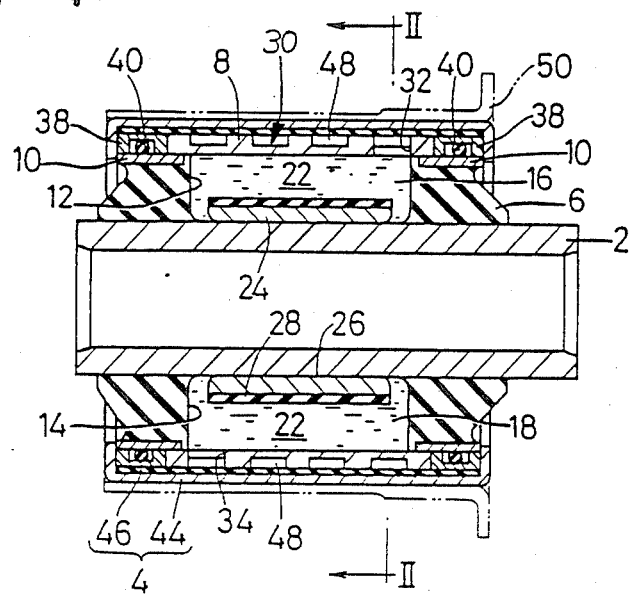
FIG. 1 is an elevational view in longitudinal cross section of one embodiment of a fluid-filled bushing of the present invention, taken along line I—I of FIG. 2.
Figure 2:
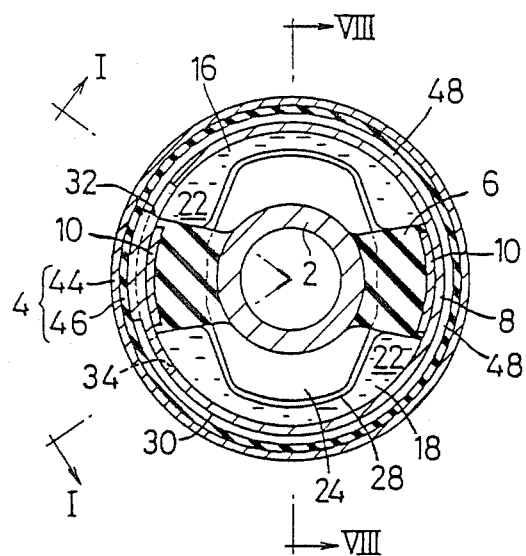
FIG. 2 is an elevational view in tranverse cross section taken along line II—II of FIG. 1.

Referring first to longitudinal and transverse cross sectional views of FIGS. 1 and 2 showing a fluid-filled resilient suspension bushing, reference numeral 2 designates an inner sleeve which is made of a metal and has a relatively large wall thickness. An outer sleeve 4 made of a metal and having a realtively small thickness is disposed radially outwardly of the inner sleeve 2, such that the inner and outer sleeves 2, 4 are coaxial with each other and radially spaced apart from each other by a predetermined suitable distance. Between these inner and outer sleeves 2, 4, there are disposed a generally annular resilient member in the form of a rubber member 6, and an orifice sleeve 8 made of a metallic material, such that the metallic orifice sleeve 8 is located radially outward of the the rubber sleeve 6. The generally annular rubber member 6 is secured at its inner surface to the outer surface of the inner sleeve 2, and at its outer surface to the inner surface of a rigid pre-compression sleeve 10, by vulcanization of the rubber member 6 during molding thereof. The orifice sleeve 8 is fitted on the rubber member 6 via the rigid pre-compression sleeve 10, as described later in greater detail.

Figure 3:
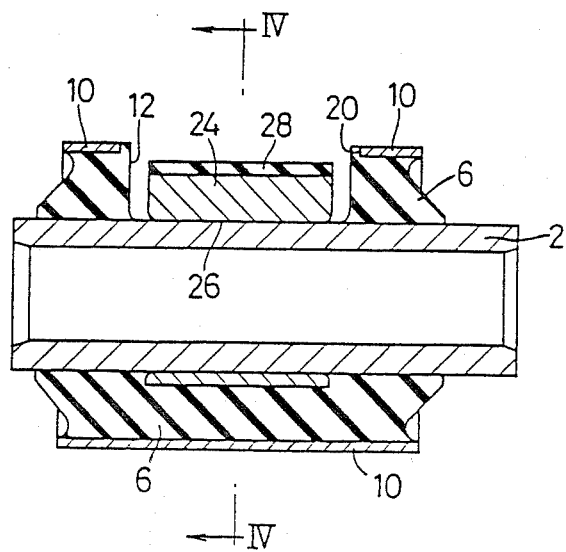
FIG. 3 is a longitudinal cross sectional view, taken along line III—III of FIG. 4, showing an assembly of an inner sleeve of the bushing of FIG. 1, and a rubber insert secured to the inner sleeve by means of vulcanization.
Figure 4:
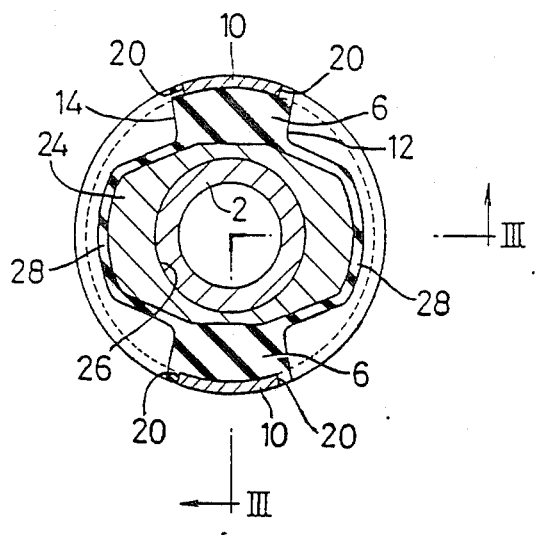
FIG. 4 is a transverse cross sectional view taken along line IV—IV of FIG. 3.

As shown in FIGS. 3 and 4, the rubber sleeve 6 integrally secured to the inner sleeve 2 has a pair of voids or pockets 12, 14 formed in its outer surface. The two pockets 12, 14 are equiangularly spaced from each other in the circumferential direction of the rubber member 6, that is, positioned opposite to each other diametrically of the inner sleeve 2, or symmetrically with respect to the inner sleeve 2. Each of the pockets 12, 14 has a depth or bottom substantially defined by the outer surface of the inner sleeve 4, and is open in the outer surface of the rubber sleeve 6. The openings of the pockets 12, 14 are closed by the inner surface of the orifice sleeve 8, whereby a corresponding pair of fluid chambers 16, 18 are formed. Namely, the orifice sleeve 8 cooperates with the rubber member 6 to define the two fluid chambers 16, 18 corresponding to the two pockets 12, 14 in the rubber member 6. The rigid pre-compression sleeve 10 has two windows aligned with the opening of the pockets 12, 14, and are dimensioned so as not to close the corresponding pockets 12, 14. The thus formed fluid chambers 16, 18 are filled with a suitable incompressible fluid 22 (FIGS. 1 and 2) such as alkylene glycols, polyalkylene grycols, silicone coil, low molecular weight polymers or water, or a mixture thereof.

A metallic stopper block 24 having a generally rectangular cross sectional shape (as seen in FIGS. 2 and 4) is press-fitted on the inner sleeve 2, such that a bore 26 formed in the stopper block 24 engages an axially intermediate portion of the outer surface of the inner sleeve 2. The stopper block 24 consists of a pair of radially outward projections which protrude from the inner sleeve 2 in opposite directions into the corresponding two fluid chambers 16, 18, so that the the end faces of the projections are located within the fluid chambers 16, 18. The end faces of the projections of the stopper block 24 serve as stopper surfaces which are abuttable on the inner surface of the orifice sleeve 8, thereby preventing an excessive displacement between the inner sleeve 2 and the orifice sleeve 8, and therefore an excessive displacement between the inner and outer sleeves 2, 4 due to excessive deformation of the rubber member 6. The stopper end surfaces of the stopper block 24 are covered with rubber layers 28 having a suitable thickness, which are formed as integral parts of the rubber member 6.

The two fluid chambers 16, 18 defined by the pockets 12, 14 of the rubber member 6 closed by the radially outwardly positioned orifice sleeve 8, are held in fluid communication with each other through a continous circumferential orifice 48 which is defined mainly by the orifice sleeve 8. Described in more detail referring to FIGS. 5-7, the orifice sleeve 8 is a generally cylindrical member which has a circumferential groove 30 with a suitable depth formed continuously in its outer surface, in the form of a generally helical groove formed round the outer circumference of the sleeve 8 almost four turns (about 3.75 turns round the sleeve 8), such that the four turns have a predetermined pitch in the axial direction of the orifice sleeve 8. As indcted in FIGS. 5 and 7, the circumferential groove 30 has four separate straight portions 30a perpendicular to the axis of the sleeve 8, and three separate parallel helical portions 30b which connect the adjacent straight portions 30a to each other. The three parallel helical portions 30b are inclined by a predetermined angle relative to the straight portions 30a, and provided at the same circumferential position of the orifice sleeve 8. It will be understood that the helical portions 30b enable the ends of the circumferential groove 30 (ends of the two outer straight portions 30a, 30a) to be spaced apart from each other by a predetermined distance in the axial direction of the orifice sleeve 8. Further, the orifice sleeve 8 has a pair of radial communication holes 32, 34 formed through its wall thickness, such that the holes 32, 34 communicate at their outer ends with the ends of the circumferential groove 30.

With the thus constructed orifice sleeve 8 mounted on the rubber member 6 via the rigid sleeve 10, the two communication holes 32, 34 communicate at their inner ends with the corresponding two fluid chambers 16, 18, as indicated in FIGS. 1 and 2.

Figure 8:
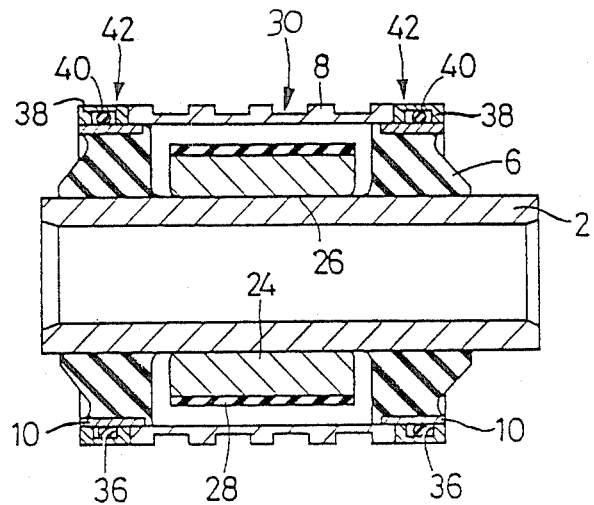
FIG. 8 is a longitudinal cross sectional view of the assembly of FIG. 3 with the orifice sleeve of FIGS. 5–7 and sealing means mounted thereon, taken along line VIII—VIII of FIG. 2.

The orifice sleeve 8 has an axial length small than that of the rigid pre-compression sleeve 10 secured to the outer surface of the rubber member 6, so that the opposite axial ends of the orifice sleeve 8 are spaced by predetermined distances away from the corresponding axial ends of the rigid pre-compression sleeve 10 in the axially inward directions, as depicted in FIG. 8. A pair of sealing means 40 are fitted on the outer surface of the rigid pre-compression sleeve 10, such that each sealing means 40 is held in contact with the corresponding end faces of the orifice sleeve 8. Each sealing means 40 consists of a metallic ring 38 having an annular groove 36 formed in the inner surface, and an O-ring 40 accommodated in the annular groove 36 so that the O-ring 40 is in sealing contact with the outer surface of the rigid sleeve 10 as shown in FIGS. 1 and 8. Thus, the two sealing means 42, 42 provides fluid tight sealing between the rigid sleeve 10 and the orifice sleeve 8.

Figure 9:
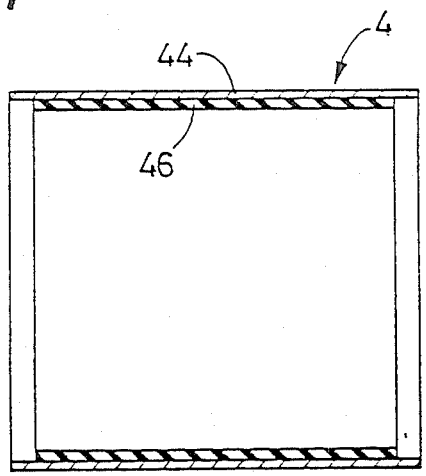
FIG. 9 is a longitudinal cross sectional view of an outer sleeve of the bushing of FIG. 1.

The sub-assembly of FIG. 8 with the orifice sleeve 8 fitted on the rubber member 6 and the rigid sleeve 10 is inserted into the outer sleeve 4. As illustrated in FIG. 9, the outer sleeve 4 consists of an outer metallic sleeve 44, and an inner sealing rubber layer 46 with a suitable thickness bonded to the inner surface of the metallic sleeve 44 by vulcanization. As shown in FIG. 1, the end portions of the outer sleeve 4 are caulked radially inwardly against the end faces of the sub-assembly 8, as shown in FIG. 1, whereby the outer sleeve 4 is fixed relative to the sub-assembly of FIG. 8. In this condition, the continuous circumferential groove 30 formed in the outer surface of the orifice sleeve 8 are closed by the inner surface of the outer sleeve 4, more precisely, by the inner surface of the sealing rubber layer 46 of the outer sleeve 4, whereby the previously indicated circumferential orifice 48 is defined between the orifice sleeve 8 and the outer sleeve 4, in the form of a generally helical passage continuously formed round the orifice sleeve 8. The circumferential orifice 48 has a length substantially equal to that of the circumferential groove 30, i.e., about four times as large as the inner circumference of the outer sleeve 4.

The thus formed generally helical circumferential orifice 48 communicates at its one end with the fluid chamber 16 through the radial communication hole 32, and at its other end with the other fluid chamber 18 through the other radial communication hole 34. Thus, the means for fluid communication between the two fluid chambers 16, 18 is constituted by the circumferential orifice 48, and the communication holes 32, 34. The orifice 48 functions to provide a resistance to a flow of the fluid 22 from one of the chambers 16, 18 to the other. However, the communication holes 32, 34 may be regarded as terminal portions of the orifice 48, if the dimensions of the holes 32 34 are so selected as to provide a flow resistance.

The fluid-filled resilient bushing described above may be suitably assembled, for example, with the following procedure.

Initially, the stopper block 24 is secured to the inner sleeve 2 by means of a press or shrinkage fit. The assembly of the inner sleeve 2 and the stopper block 24, and the rigid pre-compression sleeve 10 are positioned in place in a suitable mold. Then, an unvulcanized rubber material is poured into the mold, so that the generally annular rubber member 6 is formed between the inner sleeve 2 (with the stopper block 24 fixed thereto) and the rigid sleeve 10. Thus, the assembly of FIG. 3 is obtained. The rigid sleeve 10 is subjected to a suitable drawing process to compress the rubber member 6 in the radially inward direction, as needed. Thus, the rigid sleeve 10 may function to give the rubber member 6 a suitable degree of pre-compression. In the meantime, the outer sleeve 4 is prepared by applying the sealing rubber layer 46 to the inner surface of the metallic sleeve 44 in a vulcanization process.

The orifice sleeve 8 is mounted on the outside of the sub-assembly of FIG. 3, by means of a press fit or other method. Further, the sealing means 42 (metallic rings 38 with the O-rings 40 accommodated in the annular grooves 36) are fitted on the outer surafce of the rigid pre-compression sleeve 10, such that the metallic rings 38 are held in contact with the end faces of the orifice sleeve 8, so that the sealing means 42 and the orifice sleeve 8 are concentric or coaxial with each other. In this way, the sub-assembly of FIG. 8 is prepared. Subsequently, this sub-assembly is imnersed in a bath of the incompressible fluid 22, permitting the fluid chambers 16, 18 to be filled with the fluid 22. With the sub-assembly of FIG. 8 held within the bath, the outer sleeve 4 is press fitted on the outer surfaces of the orifice sleeve 8 and the sealing means 42, so that the circumferential orifice 48 is also filled with the fluid 22. Then, the outer sleeve 4 is subjected to a drawing process, as required, for example, by using eight dies disposed around the outer sleeve 4. Finally, the end portions of the outer sleeve 4 are caulked against the ends faces of the sub-assembly 8, and thus fixed relative to the rigid pre-compression sleeve 10. In this manner, the fluid-filled resilient bushing of FIGS. 1 and 2 having the orifice 48 is produced.

The fluid-filled resilient bushing thus constructed is generally disposed between two structural members that are connected to each other in a vibration damping and isolating fashion. As is well known in the art, one of the two structural members is attached to the inner sleeve 4 through a shaft inserted therethrough, while the other structural member is attached to the outer sleeve 4, directly, or by means of a suitable adapter such as a mounting sleeve 50 indicated in broken line in FIG. 1. For instance, the instant bushing may be suitably used as resilient damper bushings in the suspension system of an automotive vehicle.

When the resilient member 8 is deformed due to a relative displacement between the inner and outer sleeves 2, 4, the fluid 22 is forced to flow from one of the chambers 16, 18 to the other through the generally helical circumferential orifice 48 with a predetermined resistance to the fluid flow. Since the orifice 48 has a large length almost four times as large as the circumference of the outer sleeve 4, the cross sectional area of the orifice 48 may be made large enough to permit a sufficient amount of flow of the fluid 22 through the orifice 48, while maintaining the maximum phase angle frequency of the bushing at a level suitable for providing an effectively high damping effect for a desired low frequency band of vibrations, for example, vibrations of 5–50 Hz, which the present bushing is intended to damp.

While the present invention has been described in its preferred embodiment with a certain degree of particularity, it is to be understood that the invention is by no means confined to the precise details of the illustrated embodiment, but the invention may be otherwise embodied with various changes, modifications and improvements which may occur to those skilled in the art, without departing from the spirit and scope of the invention defined in the appended claims.

For example, although the rigid pre-compression sleeve 10 is useful to give the inner rubber member 6 a necessary amount of radial pre-compresssion and to enable the sealing means 42 to provide an improved sealing effect with respect to the the outer sleeve 4, the use of the rigid pre-compression sleeve 10 is not essential to practice the present invention. Further, the form of the rigid pre-compression sleeve 10 may be modified as desired. For instance, the sleeve 10 may consist of two separate rings engaging the axial end portions of the annular rubber member 6.

While the length of the generally helical circumferential orifice 48 for fluid communication between the two chambers 16, 18 is approximately four times as large as the circumference of the outer sleeve 4 or orifice sleeve 8 in the illustrated embodiment, it is possible to form the orifice 48 with other suitable lengths relative to the circumference of the outer sleeve 4, for example, two or three times, or two to three times as large as the circumference, provided that the length of the orifice 48 corresponds at least one full circumference of the outer sleeve 4 or orifice sleeve 8. The length of the orifice 48 according to the present invention may be advantageously changed or selected as desired, by accordingly selecting the length of the circumferential groove 30 formed in the outer surface of the orifice sleeve 8.

It will be understood that the fluid-filled resilient bushing according to the invention may be used not only as suspension bushings for a vehicle suspension system, but also as various other damping structures such as engine mounts for mounting an engine on the chassis of the vehicle.

I claim:

1. A fluid-filled resilient bushing, comprising:
an inner sleeve having a cylindrical outer surface;

a generally annular resilient member secured by vulcanization to the outer surface of said inner sleeve in co-axial relation with each other, and having a plurality of pockets which are open in an outer surface of the resilient member, said plurality of pockets being spaced from each other in a circumferential direction of the resilient member;

an orifice sleeve positioned radially outward of said resilient member, and closing said plurality of pockets formed in said resilient member, thus cooperating with said resilient member to define a plurality of fluid chambers corresponding to said pockets, said orifice sleeve having a circumferential groove formed continuously in an outer surface thereof so as to cover at least one full circumference of said orifice sleeve, and a plurality of radial communication holes which communicate at their outer ends with said circumferential groove and at their inner ends with said plurality of fluid chambers, respectively, said fluid chambers being filled with an incompressible fluid; and an outer sleeve fitted on the outer surface of said orifice sleeve, and closing said circumferential groove in said orifice sleeve, so as to define a continuous circumferential orifice which communicates with said plurality of fluid chambers through said plurality of radial communication holes, said circumferential orifice having a length corresponding to that of said circumferential groove.

2. A fluid-filled resilient bushing according to claim 1, wherein said circumferential groove has a helical portion which enables ends of the circumferential groove to be spaced apart from each other in an axial direction of said orifice sleeve.

3. A fluid-filled resilient bushing according to claim 1, wherein said circumferential groove has a plurality of turns round the circumference of said orifice sleeve, each of said turns including a straight portion formed perpendicularly to an axis of said orifice sleeve, and a helical portion formed at a predetermined angle with respect to said straight portion, whereby ends of said circumferential groove are spaced apart from each other in an axial direction of the orifice sleeve.

4. A fluid-filled resilient bushing according to claim 3, wherein the helical portions of said plurality of turns of said circumferential groove are parallel to each other.

5. A fluid-filled resilient bushing according to claim 3, wherein said plurality of fluid chambers consist of two fluid chambers, and said plurality of radial communication holes consist of two radial communication holes which communicate with said ends of said circumferential groove.

6. A fluid-filled resilient bushing according to claim 1, further comprising a rigid sleeve secured to the outer surface of said generally annular resilient member, said rigid sleeve having a plurality of windows corresponding to said plurality of pockets, said windows being dimensioned so as not to close the corresponding pockets, said orifice sleeve being fitted on an outer surface of said rigid sleeve.

7. A fluid-filled resilient bushing according to claim 6, wherein opposite axial ends of said orifice sleeve are spaced by predetermined distances away from corresponding opposite ends of said rigid sleeve in axially inward directions of said orifice sleeve, and said resilient bushing further comprises a pair of sealing means which are disposed axially outward of said opposite axial ends of said orifice sleeve and between said rigid sleeve and said outer sleeve.

8. A fluid-filled resilient bushing according to claim 7, wherein each of said pair of sealing means comprises a metallic ring having an annular groove formed in an inner surface thereof, and an O-ring accommodated in said annular groove.

9. A fluid-filled resilient bushing according to claim 1 wherein said outer sleeve comprises a rubber layer having a predetermined thickness, said rubber layer contacting the outer surface of said orifice sleeve and thereby fluid-tightly closing said circumferential groove so as to define said continuous circumferential orifice.

10. A fluid-filled resilient bushing according to claim 1, further comprising a stopper block which is secured to said inner sleeve so as to extend into said plurality of fluid chambers toward an inner surface of said orifice sleeve, said stopper block and said orifice sleeve being abuttable on each other upon a predetermined amount of relative displacement of said inner sleeve and said outer sleeve toward each other due to application of a vibrational load to the resilient bushing to said inner and outer sleeves.

* * * * *